United States Patent [19]

Padgett

[11] Patent Number: 4,620,694

[45] Date of Patent: Nov. 4, 1986

[54] HYDRAULIC SUSPENSION SYSTEM FOR VEHICLES INCLUDING ADJUSTABLE SHOCK ABSORBER UNIT

[75] Inventor: Ray T. Padgett, Cobb County, Ga.

[73] Assignees: Patrick F. Henry, Atlanta; William G. Ness, Powder Springs, both of Ga.

[21] Appl. No.: 164,226

[22] Filed: Jun. 30, 1980

[51] Int. Cl.$^4$ ............................................. F16F 9/44
[52] U.S. Cl. ............................... 267/64.15; 188/314; 188/319; 267/127; 280/714
[58] Field of Search ............... 188/319, 314, 299, 317, 188/282, 300, 322.15; 267/64.15, 8 R, 124, 127; 280/708, 714

[56] References Cited

U.S. PATENT DOCUMENTS

| 1,897,612 | 2/1933 | Helfrecht | 188/314 X |
| 2,025,199 | 12/1935 | Funston | 267/8 R X |
| 2,182,581 | 12/1939 | Casper | 267/8 R X |
| 2,337,738 | 12/1943 | Christensen | 267/64.15 |
| 2,780,321 | 2/1957 | Sturari | 188/319 |
| 2,819,064 | 1/1958 | Peras | 188/317 X |
| 3,647,239 | 2/1972 | Katsumori | 280/708 |
| 3,788,433 | 1/1974 | Katsumori | 188/314 |
| 3,860,225 | 1/1975 | Nakamura | 267/64.15 |
| 3,897,940 | 8/1975 | Gele | 267/64.16 |
| 3,909,035 | 9/1975 | Aikawa | 280/708 |
| 3,991,863 | 11/1976 | Lee | 188/299 X |
| 4,022,484 | 5/1977 | Davis | 280/284 |
| 4,076,271 | 2/1978 | Doncque | 280/284 |
| 4,132,395 | 1/1979 | Fox, Jr. | 267/64.23 |
| 4,153,237 | 5/1979 | Supalla | 267/64.15 |
| 4,159,106 | 6/1979 | Nyman | 267/64.15 |

FOREIGN PATENT DOCUMENTS

| 1655647 | 8/1971 | Fed. Rep. of Germany | 267/64.15 |
| 571871 | 1/1958 | Italy | 188/319 |
| 29906 | of 1913 | United Kingdom | 188/319 |

*Primary Examiner*—George E. A. Halvosa
*Attorney, Agent, or Firm*—Patrick F. Henry

[57] ABSTRACT

The first of four adjustments for the shock absorber located between the rear wheel and main frame of a motorcycle is an externally accessible filler-valve enabling the rider to adjust gas pressure in one chamber to vary spring rate and respectively a second adjustment for varying the rate of hydraulic fluid from a main chamber through a main piston to a third chamber by means of a second valve to obtain the desired rate of upper wheel travel, a third adjustment which is an adjustable pressure relief third valve to limit differential pressure between fluid in the main chamber and in the third chamber under conditions of severe impact for the rider to select damping characteristics and a fourth adjustment valve varying fluid flow from a fourth chamber to the third chamber for the rider to adjust damping during extension. Optionally, there is an air cooler chamber around the main chamber and in communication with the carburetor.

15 Claims, 7 Drawing Figures

HYDRAULIC SUSPENSION SYSTEM FOR VEHICLES INCLUDING ADJUSTABLE SHOCK ABSORBER UNIT

BACKGROUND OF THE INVENTION

1. Field of the Invention

The field of the invention is wheeled land vehicles having frames and running gear, such as motorcycles, and also having a movable rear wheel having the upward and downward motion controlled by an adjustable hydraulic suspension unit such as a shock absorber. Also adjustable hydraulic units such as shock absorbers having multiple chambers and adjustable preset pressure provided by an air valve.

2. Description of the Prior Art

Prior art includes compound shock absorbers utilizing an exterior gas supply for adjustment in the manner shown in U.S. Pat. Nos. 3,909,035; 3,897,940 and 4,132,395 but the arrangement and function is different from that shown in the present invention. Also, it is quite common to locate such shock absorbers on the rear wheel of a motorcycle interposed with the frame, such as shown in U.S. Pat. Nos. 4,022,484 and 4,076,271, although the location of the shock absorber in those patents is not the same as in the present invention and the operation is different. The shock absorbers used on motorcycles and particularly dirt bikes are inefficient for a number of reasons. First, the shock absorbers are not adequately adjustable so as to accommodate different size and weight of riders as well as that rider's preference for the ride desired for the type of terrain. Secondly, many dirt bike shock absorbers fail because of the repeated use over a course building up heat and agitating the hydraulic fluid in such a manner as to create inefficiency of operation. Thirdly, conventional dirt bike shock absorbers do not provide a proper adjustment for the dampening effect with some sort of valve means that can be set by the rider. The present invention overcomes these disadvantages through the use of several adjustments including four separate valve adjustments, which may be optionally selected for the manufacture of a unit, permitting operations and settings for conditions which severely increase the compressive loading on the unit, such as upon landing from a jump or hitting an obstruction, adjustment for conditions which moderately increase the compressive load on the unit, setting for equilibrium conditions and adjustment and operation for full extension of the unit.

SUMMARY OF THE INVENTION

A suspension system comprising a shock absorber unit having selectively four chambers, the first three of which contain a suitable hydraulic fluid and the fourth of which contains a gas, such as air introduced under pressure, and each of the four chambers being of variable volume selectively connected by valves and passages whereby under equilibrium condition the pressures in three of the chambers are equal to each other and are equal to the pressure in the fourth chamber except to the extent that there is a sliding resistance of a free piston which causes a slight difference in pressure between one chamber and another. Upon encountering conditions which moderately increase the compressive load on the unit, there is a main piston rod and piston which move to decrease the volume in a main chamber thereby forcing a hydraulic fluid from a main chamber through a valve into another chamber through a valve arrangement and separate chamber arrangements which change volumes in the chambers and ultimately restore the unit to equilibrium. Upon encountering a condition which severely increases the compressive load on the unit, such as upon landing from a jump or hitting a major obstruction, the rate of flow of the hydraulic fluid from the main chamber through a valve in increased by means of a valve and through a passage arrangement and valves increases a rate at which the unit compresses and the amount of compression with a corresponding reduction in shock to the rider. On extension, the speed of movement of the main piston rod is restricted through a valve arrangement to control the extension of the unit to a full position or a return to equilibrium.

A primary object of this invention is to provide a suspension employing an adjustable shock absorber unit having chambers and valves therein with preset control whereby under different conditions the unit will respond to meet the condition and return the unit to equilibrium. Optionally, the unit may be preset with compressed air or gas and there is an optional outside chamber arrangement which is cooled from the carburetor to reduce the heat built-up in the unit.

Still another object of this invention resides in the use of a free floating piston within one of the chambers and a valve arrangement with the main chamber whereby certain abnormal conditions are compensated for and the unit is returned to equilibrium.

Another advantage of the present unit resides in the self-containment and size whereby it may be used as the sole shock absorber unit between the main frame and the swing arm or suspension unit of the rear wheel of a motorcycle.

Other and further objects and advantages of the present invention will become apparent upon reading the following description of a preferred embodiment taken in conjunction with the accompanying drawings, in which.

DESCRIPTION OF A PREFERRED EMBODIMENT

Figure 1:
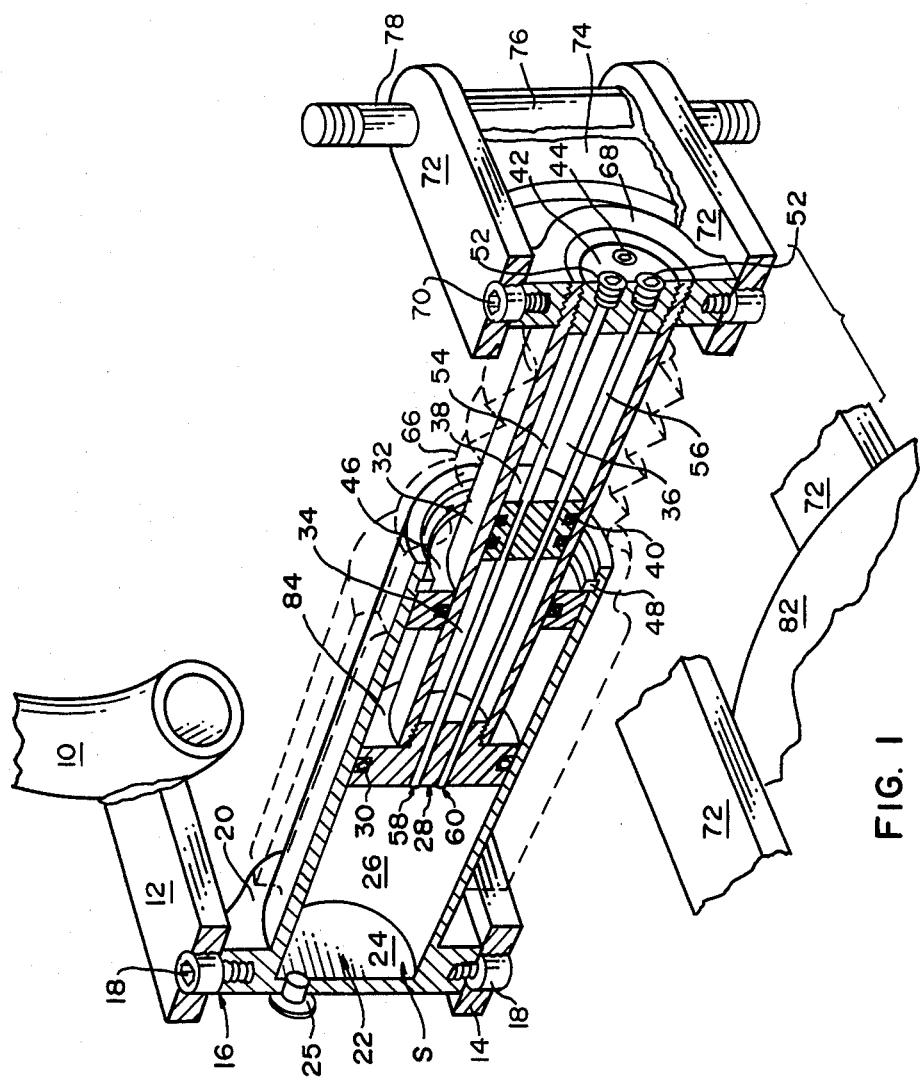
FIG. 1 is a perspective view with parts broken away of the unit attached at one end to the main frame of a motorcycle and at the other end to the swing arm upon which the rear wheel is mounted.
Figure 4:
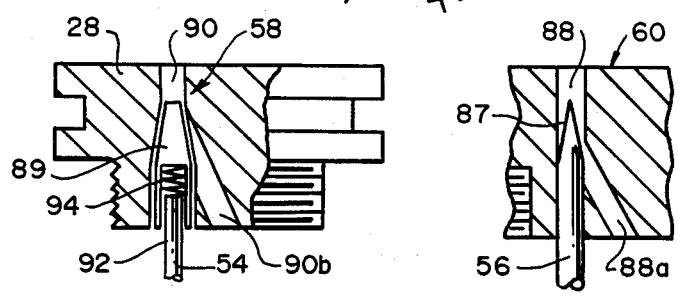
FIG. 4 is a cross-sectional view taken along lines 4—4 in FIG. 3 and showing the first valve.
Figure 5:
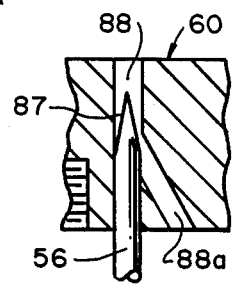
FIG. 5 is a cross-sectional view taken along lines 5—5 in FIG. 3 and showing in cross-section the second valve.
Figure 7:
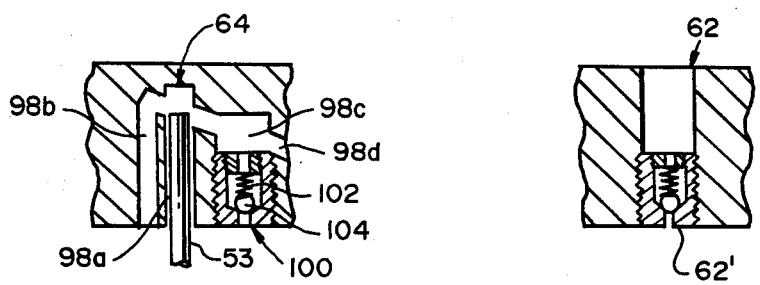
FIG. 7 is a cross-sectional view taken along lines 7—7 in FIG. 3 and showing in cross-section the fourth valve.
Figure 6:
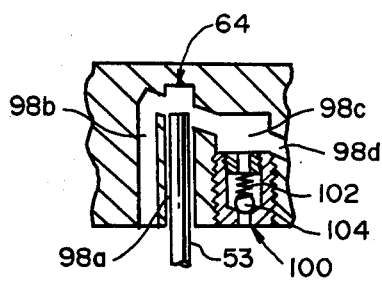
FIG. 6 is a cross-sectional view taken along lines 6—6 in FIG. 3 and showing in cross-section the third valve.

In FIG. 1 the main frame of a motorcycle comprises a tubular frame unit 10 having a pair of bracket plates 12, 14 welded thereto upon which is mounted a swivel connection 16 comprising pivot pins 18 on each side attached to a threaded collar unit 20, of conventional construction, which retains one end of a hydraulic cylinder 22 having an end plate 24 in which is a liquid fill and bleed plug 25. Cylinder 22 provides the main chamber 26 in which is located the main hydraulic fluid for the operation of the shock absorber and contains a main piston 28 having a main piston seal 30 thereon for sealed and tight operation throughout a portion of the length of the cylinder 22 against the hydraulic fluid captured therein. Piston 28 is provided with several valves to be described hereinafter and is operated in the cylinder 22 by means of a piston rod 32 which is chambered in the interior to provide a liquid chamber 34 and a gas chamber 36 which are separated by a free floating piston 38 having piston seals 40 thereon. The end of piston rod 32 is closed by a cap 42 in which is mounted a gas filler port or valve 44 which is used to provide air or gas pressure into chamber 36 on one side of free floating piston 38. The piston rod 32 is supported within the cylinder 22 for reciprocating motion therein by means of a conventional retainer ring support assembly and seal 46 which is mounted in cylinder 22 and is held in place therein by a removable retainer ring 48. The cap 42 is provided with recessed valve adjusting screws, 52 respectively connected to valve adjusting rods 53 54, 56 rod 54 leading to a first valve 58 which is a pressure relief valve shown in FIG. 4. Rod 56 leads to a second valve 60 which is the adjustable valve for upward stroke damping shown in FIG. 5. There is also third valve 62 having a ball-check arrangement 62' (shown in FIG. 6) and the fourth valve 64 (shown in FIG. 7) which is adjustable by means of rod 53 for down stroke dampening.

The piston rod 32 is covered and protected from the ring and seal 46 to the end by means of a vented flexible boot 66 which is a conventional corrugated flexible sleeve that fits over the outside of the piston rod 32 and keeps out dirt, water and some of the atmosphere. The bottom of the piston rod 32 is pivotally attached by means of a collar arrangement 68, of conventional construction, which is attached by several connection bolts 70 to opposite and respective plates 72 comprising an integral U-shaped bracket welded together by a brace 74 and sleeve 76 which supports a shaft 78 having threaded ends pivotally connected to a respective bracket or frame member 80. This is sometimes known as a swing arm which has the rear wheel 82 mounted for rotation on plates 72.

A fourth chamber 84 is defined outside of the surface of the piston rod 32 but inside one end of the cylinder 22 between the piston 28 and the ring and seal 46.

Thus, the suspension unit S consists of four chambers: main or first chamber 26, second chamber 34, third chamber 36 and fourth chamber 84, the three of which contain a suitable hydraulic fluid and one of which (third chamber 36) contains gas, the four chambers 26, 34, 84 and 36 being of variable volume and connected by valves and passages including but not limited to the valves 58, 60, 62, and 64 described above, with the exception that chamber 36 does not communicate with any other chamber.

Under equilibrium conditions, the pressures in chambers 26, 34, 84 are equal to each other and are equal to the pressure in chamber 36 except to the extent that the sliding resistance of free piston 38 causes a slight difference in pressure between the gas in chamber 36 and the fluid in chamber 34. Under these conditions, the load of the vehicle (including rider) tends to compress the unit S, this load being reacted by the above-mentioned pressure acting on an area of end cap 42 plus the horizontal cross-sectional areas of piston rod 32, adjusting rods 53, 54, 56 in the downward direction, these areas being in aggregate equal to the area of a circle of the same diameter as the outer diameter of main piston rod 32, and in the upward direction by the same pressure acting on an equal area of the end plate 24 of cylinder 22.

Upon encountering a condition which moderately increases the compressive load on the unit, main piston rod 32 and main piston 28 move so as to decrease the volume of chamber 26, thereby forcing the hydraulic fluid from chamber 26 through valve 60 in main piston 28 into chamber 34. This is accompanied by an increase in volume of chamber 84, with the increased volume being occupied by hydraulic fluid forced from chamber 34 through valve 64, which is the composite valve allowing free flow from chamber 34 to chamber 84, in main piston 28 to chamber 84. This movement of main piston rod 32 and main piston 28 results in a net increase in the volume of hydraulic fluid in chamber 34 equal to the horizontal cross-sectional area of main piston rod 32 plus the horizontal cross-sectional area of rods 53, 54, 56 and multiplied by the distance the main piston 28 moves from the equilibrium position, with the increased volume of hydraulic fluid in chamber 34 being accommodated by movement of free piston 38 toward end cap 42 of main piston rod 32, thereby decreasing the volume of chamber 36 resulting in an increase of pressure in chamber 36, this increased pressure providing the restoring force necessary to return the unit to the equilibrium position.

Upon encountering a condition which severely increases the compressive load on the unit, such as upon landing from a jump or hitting a major obstruction, the rate of flow of hydraulic fluid from chamber 26 through valve 60, comprising a tapered end 87 on rod 54 (See FIG. 5) operating in a passage 88 in main piston 28 is increased by means of first valve 58 (See FIG. 4) in main piston 28 being opened by the sharply increased pressure of the hydraulic fluid in chamber 26 relative to the pressure of the hydraulic fluid in chamber 34 forcing a tapered slide 89 of first valve 58 toward chamber 34 thereby uncovering, partially or totally, a passage 90, 90b in main piston 28 connecting the area normally occupied by the tapered slide 89 of first valve 58 with chamber 34, permitting an increased rate of flow of hydraulic fluid from chamber 26 through main piston 28 to chamber 34, with the net result of increasing the rate at which the unit compresses and, within the limits of the construction of the unit, the amount of compression with a corresponding reduction in shock to the rider. Slide 89 is a tip having an open bottom 92 capturing a spring 94 over the tip of adjusting rod 54. The load on spring 94 in valve 58 determines the differential pressure in chamber 26 (above the pressure in chamber 34) at which the slide 89 will move uncovering the end of the short passage 90 to portion 90b.

On extension, the speed of movement of the main piston rod 32 relative to cylinder 22 is restricted by the rate at which hydraulic fluid in chamber 84 is permitted to flow through valve 64 in main piston 28 to chamber 34, valve 64 being a composite valve allowing only restricted flow in the direction from chamber 84 to chamber 34. Fourth valve 64 comprises four passages 98a, 98b, 98c and 98d shown in FIG. 7 and provides a free flow path from chamber 34 to chamber 84 and a restricted path in the other direction thru a one-way ball check valve 100 having a spring 102 having a ball 104. For valve 64 four holes in main piston 28 provide the four passages 98a, 98b, 98c and 98d and passage 98c intersects all other three passages. Adjusting rod 53 adjusts the amount of restriction in the restricted flow direction. By-pass valve 62 permits the hydraulic fluid in chamber 34 an easy flow path to chamber 26 when the unit S is extending (i.e. when the wheel 82 is going downward relative to the frame 10). Valve 62 is a conventional, purchaseable one-way valve which is not adjustable. Flow of hydraulic fluid from chamber 34 through main piston 28 to chamber 26 is through check valve 62 in the free-flow direction and through valve 60. Extension of the unit S results in an increase of the aggregate volume of chambers 26, 34 and 84, allowing the pressure of the gas in chamber 36 to force the free piston 38 toward main piston 28, thus reducing the pressure in chamber 36 until either the unit S is in its fully extended position or an equilibrium condition is reestablished.

Figure 2:
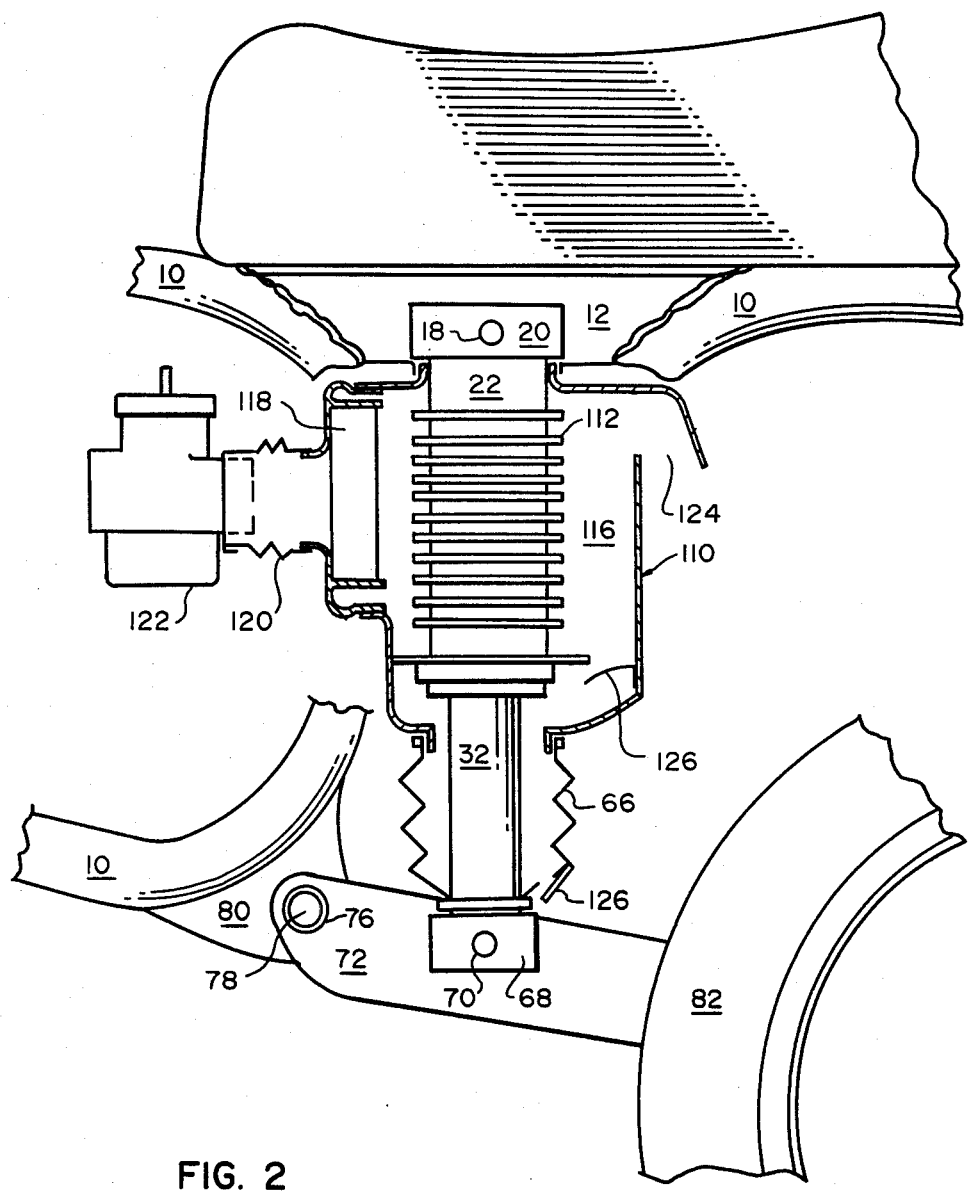
FIG. 2 is a side elevation view of part of a motorcycle and frame having a modified form of the unit in FIG. 1 thereon.
Figure 3:
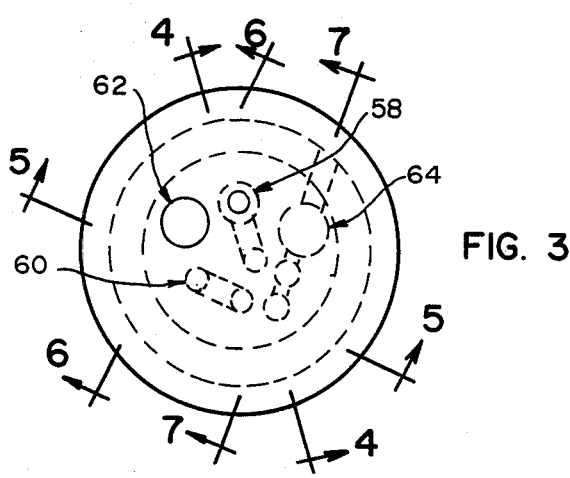
FIG. 3 is a top plan view of the end of the main piston showing the several valves located therein.

As shown in FIG. 2 an optional air cool arrangement may be applied to the present shock absorber shown in FIG. 1, as well as other types of shock absorbers. An air cool housing 110 constructed from metal, plastic or the like, has fins 112 and provides an internal air chamber 116 surrounding the cylinder 22. There is an air tight connection to the boot 66 around the piston rod 32. Air chamber 116 is in communicate with the carburetor air intake through an air filter 118 attached to a flexible boot 120 which is attached to the carburetor 122 of the motorcycle. There is an intake air opening 124 in the top of the housing 110 and conventional, rubber one-way check valves 126 between the flexible boot 66 and the housing 110

In the operation of the optional air cool attachment, air is pulled in through the air intake 124 as a result of the negative pressure created through the carburetor 122 and air flows inside chamber 116 around cylinder 22 cooling the upper portion of the suspension unit S. Air is also pulled in through air intake 124 and through chamber 116 by the negative pressure created by the bellows action of the flexible boot 66 as the suspension extends and compresses, this air being drawn through flexible boot 66 and around main piston rod 32 thereby cooling the lower portion of the suspension unit S. The bellows action of flexible boot 66 is achieved by the one-way check valves 126 so oriented that air enters flexible boot 66 at the top and exits at the bottom.

While I have shown and described a particular arrangement in the suspension unit and shock absorber, together with the optional features such as the air cooled housing, this is by way of illustration and description only and does not constitute any sort of limitation on the scope of the invention because there are various alterations, changes, revisions, omissions, additions and departures which may be made in the embodiments shown without departing from the scope of the invention as defined only by a proper interpretation of the appended claims.

What is claimed is:

1. In a suspension system shock absorber unit having separately a main first, second, third and fourth chambers, said first, second and fourth chambers having a suitable hydraulic fluid therein and said third chamber being selectively provided with a gas such as air introduced under pressure, a main piston operable in said first and fourth chambers to define same, and at times to decrease the volume in the first main chamber, a free piston movable and operable to separate and define said second and third chambers, a main piston rod for moving said main piston and having the second and third chambers defined by the free piston therein, each of the first, second and third chambers being of variable volume and said first and second and fourth chambers being selectively in communication whereby under equilibrium condition the pressures in said first, second and fourth chambers are equal to each other and are equal to the pressure in the third chamber except for any resistance of said free piston which causes a slight difference in pressure between one chamber and another, said first main piston being operable by said piston rod movement to decrease the volume in the first main chamber into the second chamber whereby the separate chamber arrangements change volumes in all chambers and ultimately restore the unit to equilibrium after encountering conditions which moderately increase the compressive load on the unit, a second valve for upward stroke damping in the main piston between the first and second chambers, a third, one-way valve operable between and second and first chambers, a fourth valve operable between the second chamber and the fourth chamber, said fourth valve comprising four passages including a passage allowing uninterrupted free flow path from the second chamber to the fourth chamber whereby the increased volume in the second chamber is accommodated by movement of the free piston thereby decreasing the volume in the third chamber resulting in increased pressure in the third chamber, and another one-way valve part of the fourth valve and when closed allowing only a restricted flow path between the fourth chamber and the second chamber, so that the speed of movement of the main piston is restricted by the rate at which hydraulic fluid in the fourth chamber is permitted to flow through the fourth valve in the main piston to the second chamber, whereby with the pressure in the fourth chamber being greater than the pressure in the second chamber restricted flow of fluid occurs from the fourth chamber to the second chamber and the other one-way valve is closed; and with the pressure in the second chamber being greater than the pressure in the fourth chamber the one-way valve is open and fluid flows freely therethrough from the second chamber to the fourth chamber.

2. The system in claim 1, wherein: said first and second valves are selectively adjustable externally of said chamber.

3. The system in claim 2, wherein: said valves are located on said main piston.

4. The device in claim 1, wherein: said second and fourth valves are externally adjustable by means of manually adjustable valve adjusting members extending through said free floating piston.

5. The device in claim 1, comprising: an adjustable first, pressure relief valve on said main piston, said second valve being adjustable on said main piston for upward stroke dampening, said third valve being on said main piston and said fourth valve being adjustable on said main piston for down stroke dampening.

6. The device in claim 5 wherein said first, second and third valves are located on said main piston, and there is an external adjustment means on said unit which is manually adjustable.

7. The device in claim 1 including:
an adjustable pressure relief first valve located in said main piston for limiting the differential pressure between fluid in the main hydraulic fluid chamber and fluid in the second hydraulic chamber under conditions of severe impact thereby permitting faster upward wheel travel.

8. The device in claim 1 wherein there is an air cooling means for said device.

9. The device in claim 1 whereupon upon encountering a condition which severely increases the compressive load on the unit, such as upon landing from a jump or hitting a major obstruction, the rate of flow of hydraulic fluid from the first chamber thru the second valve is increased by means of a first valve and main piston being actuated by the increased pressure of the hydraulic fluid in the main chamber relative to the pressure of the hydraulic fluid in the second chamber.

10. The device in claim 9 there being a tapered slide in the first valve toward the second chamber thereby uncovering, partially or totally, a passage in main piston connecting the area normally occupied by the tapered slide of first valve with the second chamber, permitting an increased rate of flow of hydraulic fluid from first chamber thru the main piston to the second chamber with the net result of increasing the rate at which the unit compresses and the amount of compression with a corresponding reduction and shock to a rider.

11. The device in claim 1, wherein: the fourth valve comprises four holes in the main piston providing four passages one of which intersects a passage in which the one-way valve is located.

12. The device in 11 wherein: said third valve is a by-pass valve permitting the hydraulic fluid in the second chamber an easy-flow path to the first chamber when the unit is extending (i.e. when the wheel is going downward relative to the frame), the third valve being a conventional one-way valve which is not adjustable.

13. The device in claim 1 wherein there is a first valve in said main piston for a condition which severly increases the compressive load on the unit, such as landing from a jump or hitting a major obstruction, comprising a passage in the main piston and a valve member in said passage which is opened by the increased pressure of the hydraulic fluid in the main chamber relative to the pressure in the second chamber.

14. The device in claim 13 wherein said first valve member comprises a tapered slide in said passage and spring means biasing said slide thereby determining the differential pressure at which the slide with move to open the passage.

15. The device in claim 14, wherein said passage comprises a short passage which is opened by said slide thereby permitting the increased flow.

* * * * *